United States Patent
Porcheret et al.

(10) Patent No.: US 12,194,719 B2
(45) Date of Patent: Jan. 14, 2025

(54) SHAPING STRUCTURE, COMPOSITE PART COMPRISING SUCH A SHAPING STRUCTURE, METHOD FOR MANUFACTURING SUCH A COMPOSITE PART

(71) Applicant: Porcher Industries, Eclose-Badinières (FR)

(72) Inventors: Jacques Porcheret, Veyssilieu (FR); Freddy Macrez, Lagnieu (FR); Patrick Ramel, Charnoz (FR)

(73) Assignee: Porcher Industries, Eclose-Badinières (FR)

( * ) Notice: Subject to any disclaimer, the term of this patent is extended or adjusted under 35 U.S.C. 154(b) by 0 days.

(21) Appl. No.: 18/327,522

(22) Filed: Jun. 1, 2023

(65) Prior Publication Data
US 2023/0391044 A1   Dec. 7, 2023

Related U.S. Application Data

(62) Division of application No. 16/614,126, filed as application No. PCT/EP2018/062305 on May 14, 2018, now abandoned.

(30) Foreign Application Priority Data

May 15, 2017   (FR) ...................................... 1754261

(51) Int. Cl.
*E04C 2/06* (2006.01)
*B29C 70/68* (2006.01)
(Continued)

(52) U.S. Cl.
CPC .............. *B32B 3/28* (2013.01); *B29C 70/687* (2013.01); *B32B 5/022* (2013.01); *B32B 5/18* (2013.01);
(Continued)

(58) Field of Classification Search
CPC .................................... B32B 3/28; E04C 2/06
See application file for complete search history.

(56) References Cited

U.S. PATENT DOCUMENTS

| | | | | |
|---|---|---|---|---|
| 5,758,463 A | * | 6/1998 | Mancini, Jr. | E04C 2/384 52/309.7 |
| 6,263,629 B1 | * | 7/2001 | Brown, Jr. | E04C 5/07 442/179 |

(Continued)

FOREIGN PATENT DOCUMENTS

| | | |
|---|---|---|
| CN | 102416713 | 4/2012 |
| JP | 1975045375 | 5/1975 |

(Continued)

OTHER PUBLICATIONS

English language translation of JP 2004-149929A, generated on May 16, 2024 with Japanese Platform for Patent Information website (https://www.j-platpat.inpit.go.jp/).*

*Primary Examiner* — Mark Ruthkosky
*Assistant Examiner* — Julia L Rummel
(74) *Attorney, Agent, or Firm* — B. Aaron Schulman, Esq.; Stites & Harbison, PLLC

(57) ABSTRACT

This shaping structure (1) comprises two shaping sheets (5, 7) facing each other at a distance from one another. According to the invention, the shaping structure (1) further comprises a macroporous spacer sheet (9), the spacer sheet (9) being arranged between the two shaping sheets (5, 7) and being corrugated in such a way as to form a series of alternating even peaks (18) and odd peaks (20) distributed in a first direction (D1) of the shaping structure, at least one of the even peaks (18) being attached to the first shaping sheet (5), at least one of the odd peaks (20) being attached to the second shaping sheet (7), each peak (18, 20) attached in this (Continued)

way defining an attachment surface (22, 26) for attachment to the shaping sheet (5, 7) to which this peak (18, 20) is attached.

16 Claims, 3 Drawing Sheets

(51) Int. Cl.
  *B32B 3/28* (2006.01)
  *B32B 5/02* (2006.01)
  *B32B 5/18* (2006.01)
  *B32B 5/24* (2006.01)
  *E04C 2/34* (2006.01)
  *B29K 105/04* (2006.01)
  *B29L 31/10* (2006.01)

(52) U.S. Cl.
  CPC ............... *B32B 5/245* (2013.01); *E04C 2/06* (2013.01); *E04C 2/3405* (2013.01); *B29K 2105/04* (2013.01); *B29L 2031/10* (2013.01); *B32B 2419/00* (2013.01); *E04C 2002/3455* (2013.01)

(56) References Cited

U.S. PATENT DOCUMENTS

| | | | |
|---|---|---|---|
| 2011/0195220 A1 | | 8/2011 | Brandon et al. |
| 2015/0033655 A1* | | 2/2015 | Kromer ............... E04C 5/073 52/425 |

FOREIGN PATENT DOCUMENTS

| | | |
|---|---|---|
| JP | 1979124080 | 5/1975 |
| JP | 1976036571 | 3/1976 |
| JP | 1978019320 | 2/1978 |
| JP | 1990095734 | 7/1990 |
| JP | 1991079336 | 4/1991 |
| JP | 1992007136 | 1/1992 |
| JP | 2004149929 A * | 5/2004 |
| JP | 1983050796 | 2/2016 |

\* cited by examiner

SHAPING STRUCTURE, COMPOSITE PART COMPRISING SUCH A SHAPING STRUCTURE, METHOD FOR MANUFACTURING SUCH A COMPOSITE PART

CROSS-REFERENCE TO RELATED APPLICATIONS

This application is a divisional application of U.S. Ser. No. 16/614,126, having a filing date of Nov. 15, 2019, which was a 371 application of International application PCT/EP2018/062305, filed May 14, 2018 and claimed benefit of French patent application 1754261, filed May 15, 2017, all of said applications incorporated herein by reference.

FIELD

The present invention relates to a shaping structure, a composite part that comprises such a shaping structure, and a method for manufacturing such a composite part. The invention relates to the field of composite materials.

BACKGROUND

FR 2,060,612 B describes a fabric shaper for hardenable materials, the shaper including two plies of fabric that are kept separated from one another at a distance limited by spacer threads distributed on their surfaces.

For certain applications, this fabric shaper has the drawback of requiring the implementation of a large number of spacer threads to offer a sufficient strength with respect to the constraints imposed by the hardenable material introduced between the two plies, tending to separate the plies from one another. The addition of these additional spacer threads complicates the manufacturer of the shaper. Additionally, the tensioning of the spacer threads creates periodic stress concentration zones, which are located at the seam area of the spacer threads with the plies. Thus, the stress concentration zones may produce tear initiations of the plies. Additionally, before the introduction of this hardenable material between the plies, one must ensure that the two plies are in fact separated from one another over their entire surface, in order to allow a satisfactory and regular insinuation of the hardenable material between them, in particular for hardenable materials with poor flowability.

As a result, the invention aims to address the aforementioned drawbacks by proposing a new versatile shaping structure that, while being easy to use, is particularly strong, inexpensive and is advantageously self-supporting.

BRIEF SUMMARY

The invention relates to a shaping structure, comprising two shaping sheets facing one another at a distance from one another.

According to the invention, the shaping structure further comprises a macroporous spacer sheet, the spacer sheet being arranged between the two shaping sheets and being corrugated in such a way as to form a series of alternating even peaks and odd peaks, distributed in a first direction of the shaping structure, at least one of the even peaks being attached to the first shaping sheet, at least one of the odd peaks being attached to the second shaping sheet, each peak attached in this way defining an attachment surface for attachment to the shaping sheet to which this peak is attached.

Owing to the invention, the spacer sheet offers a dual function, by imparting a significant resistance and a self-supporting nature to the shaping structure. First, the surface nature of this spacer sheet makes it intrinsically resistant to the forces that tend to separate the shaping sheets from one another, in particular when a hardenable material in the non-hardened state, or cross-linkable in the non-cross-linked state, is introduced between these shaping sheets, in order to form a part from composite material, or "composite part", with the shaping structure. Additionally, this surface nature of the spacer sheet makes it possible to provide surface fastening of this spacer sheet with the shaping sheets, via the fastening surface, such that the fastening withstands the aforementioned forces and distributes the stresses applied on the shaping sheets by the spacer sheet, which limits the tearing risk of the shaping sheets by stress concentration. When a hardenable or cross-linkable material is introduced between the shaping sheets, the macroporous nature of the spacer sheet further promotes a good distribution of the hardenable or cross-linkable material passing without difficulty through the macropores of the macroporous spacer sheet. Furthermore, when a hardenable or cross-linkable material is shaped between the shaping sheets in a hardened state, the spacer sheet acts as a structural reinforcement for this hardenable or cross-linkable material, like a framework, such that the composite part thus formed is particularly robust. It is therefore not necessary to provide a specific reinforcing framework. Furthermore, the spacer sheet, compared to simple threads, has a relatively high rigidity to keep the shaping sheets at a distance from one another over all or part of their surface in the absence of stresses seeking to bring the shaping sheets closer to one another, or in the presence of modest stresses, even if no hardenable or cross-linkable material is introduced between the two shaping sheets. Thus, the shaping structure is self-supporting. Nevertheless, it is advantageously provided that the spacer sheet has a certain resiliency, so as to allow folding or flattening of the shaping structure, by applying a sufficient force, seeking to fold the shaping sheets down against one another, in order to reduce the bulk of the shaping structure. It is also possible to provide that the spacer sheet is particularly rigid so as to prevent this folding or flattening. In any case, due to this self-supporting nature, the shaping structure can be used alone, as light self-supporting structure, or as spacer, without introducing material between the shaping sheets. Lastly, the shaping structure of the invention has the advantage of being particularly inexpensive to manufacture.

According to other optional and advantageous features of the invention, considered according to all technically allowable combinations:
- it is provided that at least two successive even peaks are attached to the first shaping sheet, thus respectively defining two successive attachment surfaces, and a length between peaks, measured parallel to the first direction between these two successive attachment surfaces, has a value of between 1.0 times and 1.5 times the value of a surface length of the attachment surface, this surface length being measured parallel to the first direction;
- the even peaks are regularly distributed in the first direction, and the odd peaks are regularly distributed in the first direction;
- at least one of the attachment surfaces is the seat of an attachment using an attachment agent, such as a thermoplastic binder, attaching the peak in question with the shaping sheet in question, the attachment agent being distributed on the attachment surface of this peak;

at least one of the attachment surfaces is the seat of an attachment by welding of the peak in question with the shaping sheet in question, while the attachment sheet in question comprises a layer of heat-sensitive material used for this welding;

at least one of the attachment surfaces is the seat of an attachment by sewing of the peak in question with the shaping sheet in question;

among the two shaping sheets, at least one shaping sheet comprises a layer of nonwoven material;

the layer of nonwoven material comprises a glass web comprising glass fibers connected to one another;

the macropores of the spacer sheet have a nominal size of between about 2 and 40 mm, preferably between 5 and 20 mm;

the macroporous spacer sheet comprises a grid of longitudinal threads and transverse threads connected at their intersections;

the grid of threads has a density of threads of between 0.25 and 5 threads per centimeter, preferably between 0.5 and 2 threads per centimeter.

The invention also relates to a composite part. According to the invention, the composite part comprises a shaping structure according to the preceding, and a central layer, formed by a hardenable or cross-linkable material, respectively in the hardened or cross-linked state, the central layer occupying the space between the two shaping sheets, the spacer sheet extending within the central layer.

Preferably, the hardenable or cross-linkable material has a foamed structure when it is respectively in the hardened or cross-linked state.

The invention also relates to a method for producing a composite part according to the preceding. According to the invention, the manufacturing method comprises a step a) for introducing hardenable or cross-linkable material, respectively in a non-hardened or non-cross-linked state, between the two shaping sheets of the shaping structure in order to form the central layer, the two shaping sheets delimiting the shape of the central layer by shaping of the hardenable or cross-linkable material between these two shaping sheets.

BRIEF DESCRIPTION OF THE DRAWING FIGURES

The invention will be better understood upon reading the following description, provided solely as a non-limiting example and done in reference to the appended drawings, in which.

DETAILED DESCRIPTION

Figure 7:
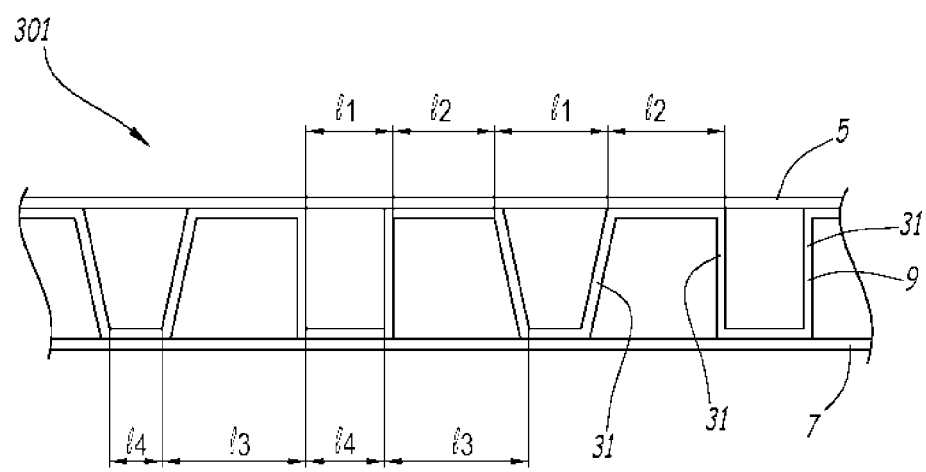
FIG. 7 is a partial side view of a shaping structure according to another embodiment according to the invention.

FIGS. 1 to 4 illustrate a shaping structure 1. The shaping structure 1 primarily comprises a shaping sheet 5, a shaping sheet 7 and a spacer sheet 9. In the drawings, FIGS. 5, 7 and 9 are shown with a very exaggerated thickness in order to facilitate the reading. In reality, sheets 5, 7 and 9 are shown with an average thickness for example of between 0.1 mm and 5 mm, depending on the application.

The two shaping sheets 5 and 7 face one another and are at a distance from one another. Preferably, the sheets 5 and 7 are substantially parallel to one another.

Figure 1:
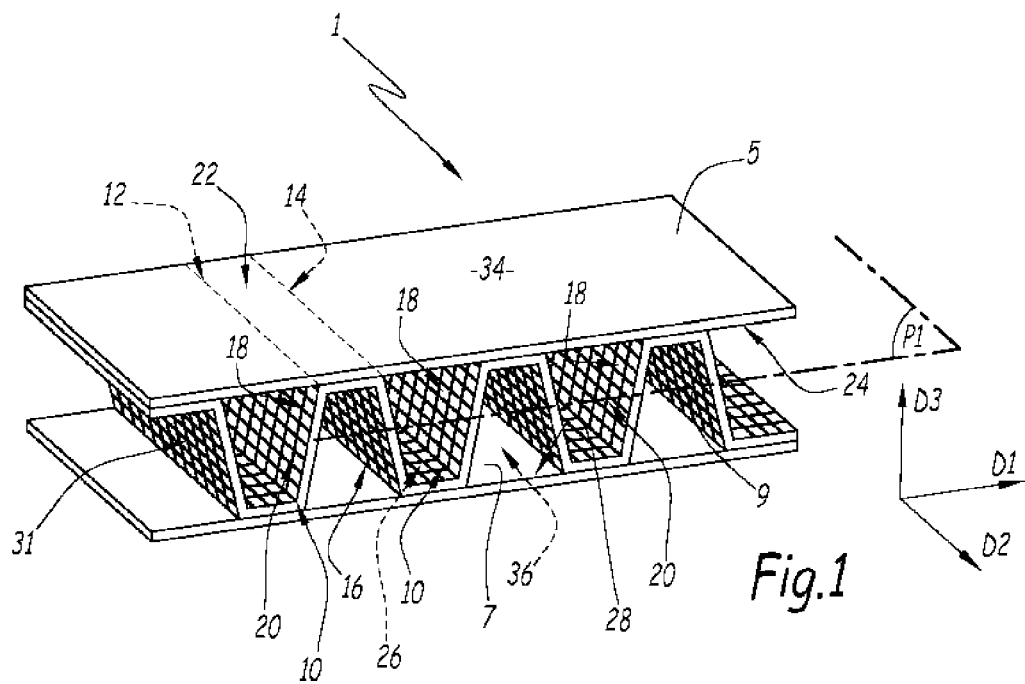
FIG. 1 is a perspective view of a shaping structure according to one embodiment according to the invention.

The spacer sheet 9 is arranged between the sheets 5 and 7. The spacer sheet 9 has a corrugated shape. In the present example, the corrugation of the sheet 9 is made by bending this sheet 9 along parallel lines, preferably lines 10, 12, 14 and 16. In FIG. 1, the lines 12 and 14 are shown by dotted lines by transparency through the sheet 5. In its corrugation, the spacer sheet 9 describes a series of peaks 18 and 20, or waves, including even peaks 18, oriented from the side of the sheet 5, and odd peaks 20, oriented from the side of the sheet 7. The even peaks 18 each bear two bending lines 12 and 14, while the odd peaks 20 each bear two bending lines 10 and 16. When a median plane P1 is defined extending midway between the sheets 5 and 7 parallel to the latter, the even peaks 18 are formed by the parts of the sheet 9 comprised between the plane P1 and the sheet 5, then the odd peaks 20 are formed by the parts of the sheet 9 that extend from the other side of the median plane P1, between this median plane P1 and the sheet 7. Thus, these even peaks 18 and these odd peaks 20 alternate and are distributed along a direction D1 parallel to the plane P1 of the shaping structure 1.

Figure 2:
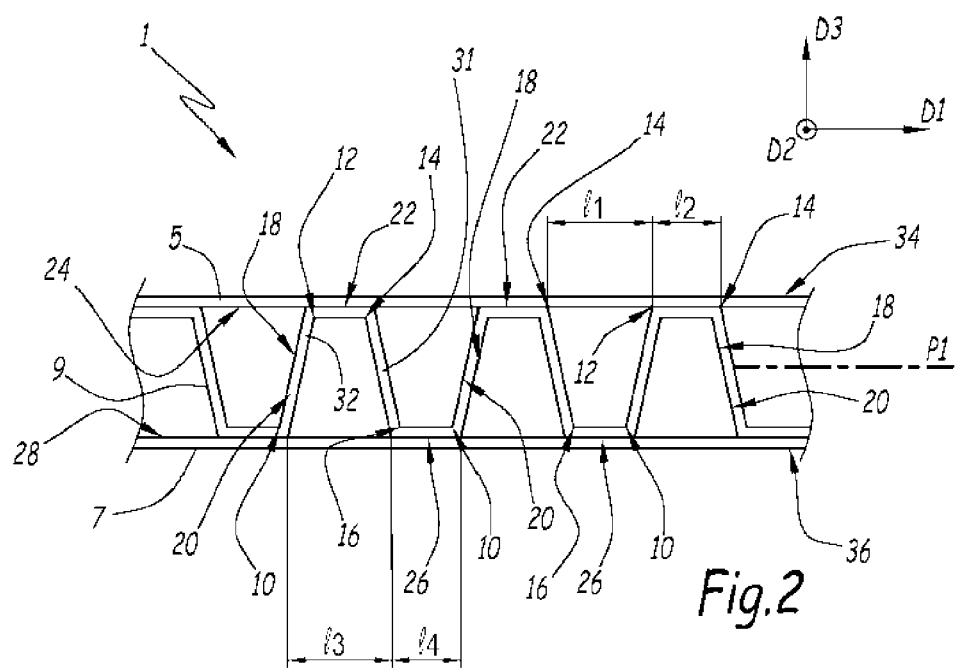
FIG. 2 is a partial side view of the shaping structure of FIG. 1.
Figure 3:
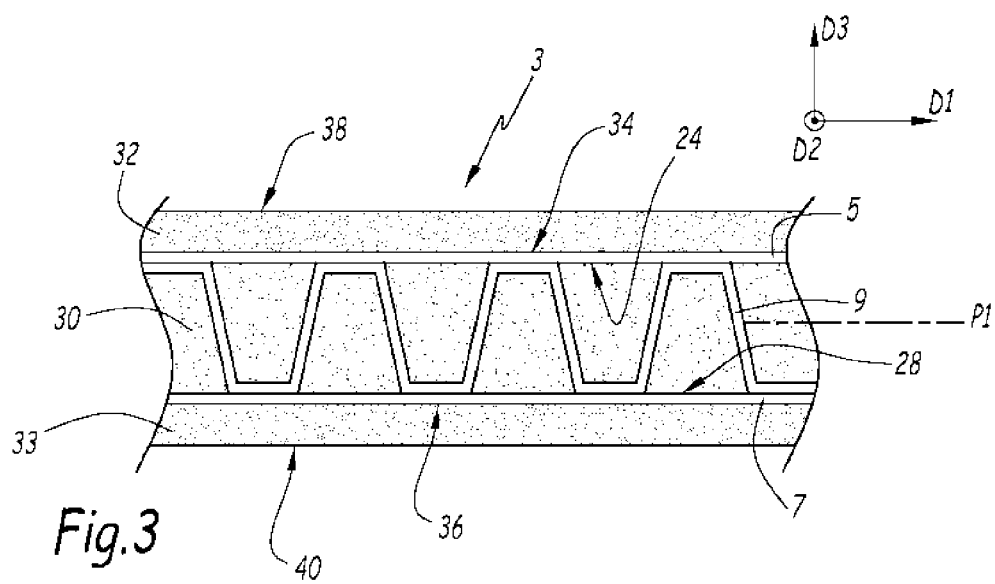
FIG. 3 is a view similar to FIG. 2, of a composite part comprising the shaping structure of FIGS. 1 and 2.

In the present example, each even peak 18 is fastened to the sheet 5 and each odd peak 20 is fastened to the sheet 7. Each even peak 18 defines a surface 22 delimited by the lines 12 and 14, by which the peak 18 is attached to the sheet 5. This surface 22 bears against an inner face 24 of the sheet 5, this inner face 24 facing the sheet 7. Likewise, each odd peak 20 defines a surface 26 delimited by the lines 10 and 16, by means of which the peak 20 is attached to the sheet 7. The surface 26 bears against an inner face 28 of the sheet 7, this inner face 28 facing the sheet 5. In the example of FIGS. 1 to 3, all of the surfaces 22 and 26 are the seat of an attachment means of the sheet 9, respectively to the sheet 5 and to the sheet 7.

In the present example, the peaks 18 and 20 are all attached using the same means. In a variant, it is also possible to provide different means for attaching one peak 18 or 20 to the other.

The attachment of the peaks 18 and 20 is preferably done using an attachment agent, or adhesive agent, such as a thermoplastic binder. The attachment agent is preferably distributed on the entire surface 22 or 26 in question. Alternatively or additionally, the attachment of each peak 18 or 20, respectively with the sheet 5 or 7, is done by sewing the peak 18 or 20 in question with the shaping sheet 5 or 7 in question. In practice, one or several threads are used in turn passing through the spacer sheet 9 with the shaping sheet 5 or 7 associated with the surface 22 or 26 in question, in order to form stitches, preferably distributed over the entire surface 22 or 26 in question. Alternatively or additionally, the attachment can be done by welding. High-frequency ultrasonic welding is preferred, although other welding techniques can be implemented. To that end, it is for example provided that at least one of the sheets 5, 7 and 9 comprises, locally for the surfaces 22 or 26, or over the entire surface of the sheet 5, 7 and/or 9 in question, a layer of material suitable for this attachment mode, of the heat-sensitive material type. This heat-sensitive material is used for welding, that is to say, the attachment is done using this material, which serves as material for forming the weld at the attachment surfaces. For example, the heat-sensitive material reacts to the high-frequency ultrasounds to cause the welding. Preferably, the layer of heat-sensitive material is provided on at least one of the sheets 5 and 7. For example, it is possible to choose one of the following heat-sensitive materials, depending on the reactivation temperature and the adhesion force that they procure: EVA (ethylene vinyl acetate), PU (polyurethane), PVC (polyvinyl chloride), polyolefin hotmelt adhesives, polyamide, acrylic. Any other heat-sensitive material can be used depending on the application.

Any other attachment means appropriate for the application can also be considered.

In a variant, it is provided that certain surfaces 22 and 26 are not the seat of an attachment of the corresponding peak 18 or 20, but simply the seat of a contact or bearing of the peak 18 or 20 in question against the sheet 5 or 7 in question. At a minimum, it is provided that at least one peak 18 is attached to the sheet 5 and that at least one peak 20 is attached to the sheet 7.

Preferably, like in the case of the embodiment of FIGS. 1 to 4, the even peaks 18 and the odd peaks 20 are regularly distributed in the direction D1.

Between two successive surfaces 22 and 26, the sheet 9 forms a ray 31, each ray 31 being formed by a part of the sheet 9 that extends between a successive surface 22 and surface 26. The rays 31 extend obliquely or forming a right angle with the sheets 5 and 7, according to the considered embodiments. In scenarios 1 to 3, the rays are oblique.

The spacer sheet 9 is macroporous, that is to say, it comprises through openings distributed over its entire surface, or at least over a portion of the area of its rays 31. This macroporous nature allows the passage of a liquid or softened material from one side to the other of the sheet 9, when this material is poured or injected between the sheets 5 and 7. For example, the nominal size of the macropores, that is to say, in particular due to their average diameter if the macropores have a rounded shape, or the length of their largest size if the macropores have a quadrilateral shape, is between about 2 and 40 mm, preferably between about 5 and 20 mm (millimeters). The size of the macropores is adapted as a function of the viscosity of the material to be poured or injected.

This shaping structure 1 can be configured to allow the manufacturing of a composite part 3, like that shown in FIG. 3. "Component part" 3 refers to a part made from a composite material comprising both the structure 1 and at least one additional material. The part 3, depending on the materials used, for example makes up:

a separating panel, for thermal or sound insulation,
a trim panel,
a shock absorber pad,
a structural reinforcing panel,
all or part of a precast, a partition, a wall, a floor or the like.

Depending on the materials used, the part 3 can be suitable for the construction of a building or any other immobile structure or infrastructure such as a bridge or platform, or for incorporation into moving objects, such as flying, land-based or nautical vehicles, or furnishings.

Alternatively, this shaping structure 1 can be used alone, that is to say, without being combined with an additional material, for example in the form shown in FIG. 1. "Used alone" in particular means that no material is added between the sheets 5 and 7. One or several outer layers can, however, be provided on respective outer faces 34 and 36 of the sheets 5 and 7. It is possible to consider applications similar to those mentioned above for the part 3. Otherwise, the structure 1 used alone can serve as an air circulation structure, for example for ventilation or heating. The air is then made to pass between the sheets 5 and 7, the air spreading through macropores. Also alternatively, the structure 1 used alone can serve as an inflatable structure for the lift of an aircraft, or the buoyancy of a watercraft. Also alternatively, the structure 1 can serve as spacer or separator, due to its self-supporting nature, as explained hereinafter.

In the present example, the composite part 3 of FIG. 3 comprises the shaping structure 1 of FIGS. 1 and 2.

The part 3 comprises a central layer 30 occupying, that is to say, preferably completely invading, the space between the sheets 5 and 7. In particular, the spacer sheet 9 extends within the layer 30, and is preferably embedded in this layer 30. The central layer 30 is in contact with at least the majority of the area of the faces 24 and 28.

The composite part 3 advantageously comprises two outer layers 32 and 33, which advantageously serve as cladding, so as to form cladding layers. The layers 32 and 33 are respectively attached against the outer faces 34 and 36 of the sheets 5 and 7, while being in contact with at least the majority of their area. The outer face 34 faces away from the sheet 7, and the outer face 36 faces away from the sheet 5. The layers 32 and 33 preferably have a constant average thickness, measured in the direction D3. Preferably, each layer 32 and 33 respectively has an outer face 38 and 40, which is left free. The faces 38 and 40 can be flat, or have reliefs, depending on the desired application.

In a variant, the component part 3 is stripped of outer layer, the outer faces 34 and 36 being left free. Alternatively, the component part 3 comprises only the layer 32 or only the layer 33.

Depending on the area of the sheets 5 and 7, the distance that separates them, and more generally depending on the desired application, the number of peaks 18 and 20 and the dimensions of the sheet 9 are adapted. For example, it is provided that the sheets 5 and 7 measure between 1 and 100 m$^2$ (square meters), whereas they are separated by a spacing distance of between 5 and 50 cm (centimeters). The spacing distance is measured parallel to a direction D3, perpendicular to the directions D1 and D2. At minimum, when the area of the sheets 5 and 7 is particularly small, two even peaks 18 and one odd peak 20 are provided, or vice versa.

Figure 4:
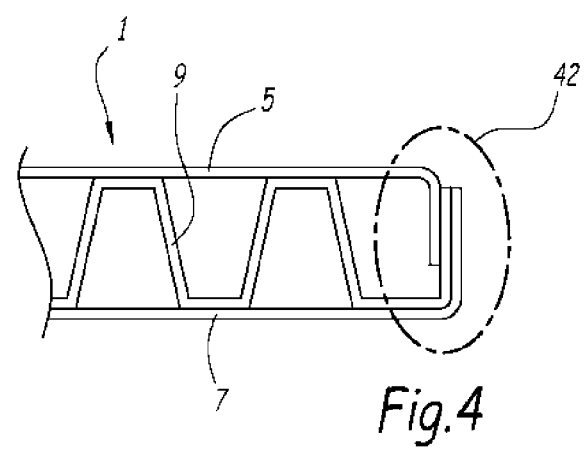
FIG. 4 is another partial side view of the shaping structure of FIGS. 1 to 3.
Figure 5:
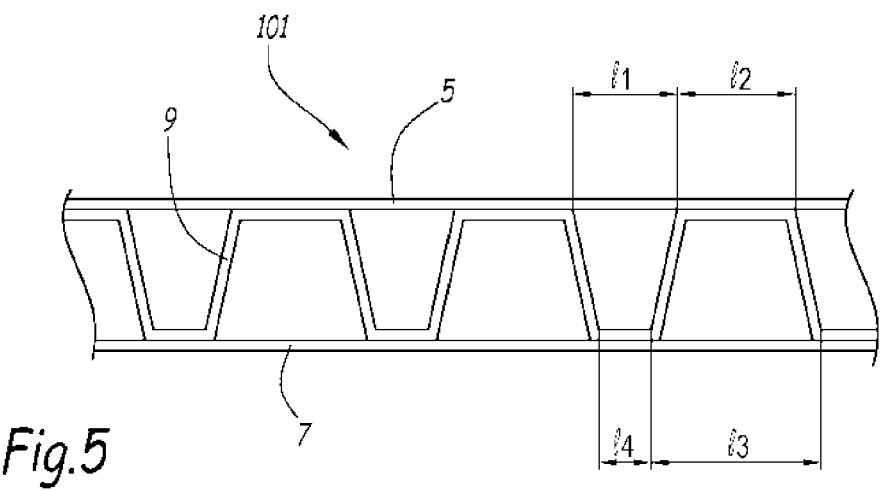
FIG. 5 is a partial side view of a shaping structure according to another embodiment according to the invention.

As illustrated in FIG. 4, the structure 1 preferably comprises a closed edge 42. In order to form this closed edge, the end parts of the sheets 5, 7 and 9 have been folded down against one another, which have advantageously been attached by gluing or any other appropriate means. The sheets 5 and 7 thus define, at least on one edge, a closed contour delimiting an inner space.

In a variant, the sheets 5 and 7 are thus not folded down, so as to leave the edge 42 of the structure 10 open.

Preferably, the structure 1 has a rectangular general shape so as to define four edges, two of which are closed according to FIG. 4, or according to any other means, and one of which is left open, such that the structure 1 forms a shaping pouch, the open edge of which makes it possible to insert a hardenable material in the non-hardened state within the inner space of the structure 1, defined between the sheets 5 and 7. The hardenable material is defined hereinafter.

As illustrated in FIG. 2, an inter-peak length l1 is defined, which is measured parallel to the direction D1 between two successive surfaces 22. An inter-peak length l3 is measured in the same way between two successive surfaces 26. More specifically, the length l1 is measured between the bending line 14 of a first of the surfaces 22 and the bending line 12 of a second of the surfaces 22, successive to the first surface 22, located in the direction D1 relative to the first surface 22. The same is true for the length l3, measured between two successive lines 10 and 16. Furthermore, a surface length l2 is defined, corresponding to the length measured parallel to the direction D1 of one of the surfaces 22, between the two lines 12 and 14. A surface length l4 is defined in the same way, for each surface 26, between the lines 10 and 16 in question.

Preferably, it is provided that the length l1 has a value between 1.0 times and 1.5 times the value of the length l2, for all of the peaks 18 and 20 of the structure 1. The same length ratio is provided between the length l3 and the length l4. For example, it is provided that the length l1 measures 1.25 times the length l2.

Irrespective of the selected length ratio, the fastening of the sheet 9 on the sheets 5 and 7 is done on surfaces whose area is relatively large so as to distribute the stresses, in particular to avoid any risk of tearing of the sheets 5, 7 or 9 when antagonistic forces are applied on the faces 24 and 28 by a hardenable material in the non-hardened state.

In the embodiment of FIGS. 1 to 4, the lengths l1 and l3 are equal, and the lengths l2 and l4 are equal.

In the shaping structure 101 of the embodiment of FIG. 5, the lengths l1 are equal to one another and are smaller than the lengths l3, which in turn are equal to one another. In the figures, the elements designated by like reference signs relate to similar features of the invention, even if they assume different embodiments.

Figure 6:
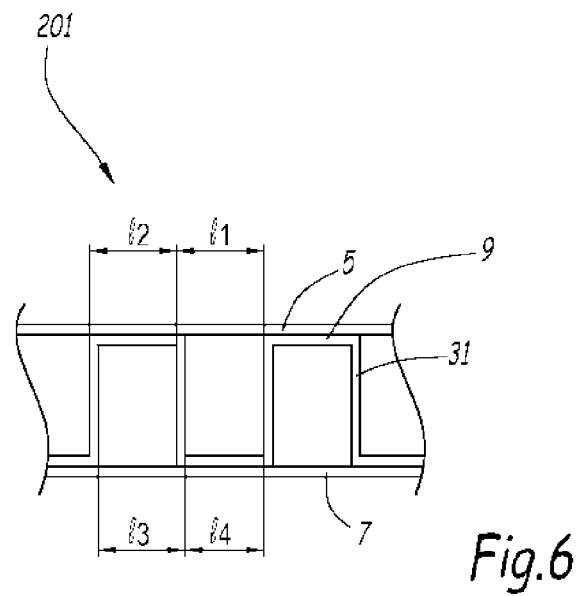
FIG. 6 is a partial side view of a shaping structure according to another embodiment according to the invention.

In the shaping structure 201 of the embodiment of FIG. 6, the lengths l1, l2, l3 and l4 are equal, which leads to rays 31 that are parallel to one another.

In the shaping structure 301 of the embodiment of FIG. 7, the lengths l2 are equal to one another while the lengths l1 are of different value. Likewise, the lengths l3 are equal, while the lengths l4 have different values. Certain rays 31 are perpendicular to the sheets 5 and 7, while others are oblique.

In a variant, other ratios between the lengths l1 and l2 can be adopted based on the application, in order to adapt the area of the surfaces 22 and 26 to the desired application.

Preferably, irrespective of the considered embodiment, each shaping sheet preferably comprises one or several layers of nonwoven material and/or one or several films. Among the layers of nonwoven, it is possible to provide a glass web, that is to say, a nonwoven surface material comprising glass fibers linked to one another. This linking can be done chemically, for example using a glue. In particular, the glass fibers are short fibers.

The glass web makes it possible to cause the shaping sheets advantageously to have a pore size that makes them permeable to certain gases, steam and certain volatile solvents, while being impermeable to certain liquids and to solids. More particularly, this pore size is able to allow the hardening or drying of a hardenable material introduced into the shaping structure between the shaping sheets. Although the glass web is preferred, any other layer of nonwoven material making it possible to obtain such properties can be used, depending on the considered application.

However, it is possible to provide that at least one of the shaping sheets is impermeable to certain gases, in particular air or helium, in particular in the case where the shaping structure is used for the circulation of air or is inflated.

As a nonwoven layer, it is also possible to provide the aforementioned heat-sensitive material, to allow the attachment of the shaping layers to the spacer layer by welding.

It is also possible to provide a film made from a thermoplastic or thermosetting material.

For each shaping sheet, it is possible to provide two or more distinct layers of nonwoven material, for example a glass web layer as mentioned above and a layer of heat-sensitive material as mentioned above.

In a variant, only one of the two shaping sheets comprises one of the layers of nonwoven material as mentioned above, while the other shaping sheet is devoid thereof.

In another embodiment, at least one of the shaping sheets comprises a layer of fabric, optionally coated, in order to obtain the porosity properties as previously mentioned. The presence of the fabric can serve to impart mechanical reinforcement to the shaping sheet in question.

Preferably, like in the example illustrated in FIGS. 1 to 4, the spacer sheet 9 comprises, or is formed by, a grid of threads, the macropores being formed by the openings delimited by the meshes of this grid. The use of such a grid makes it possible to obtain a satisfactory compromise between the cost price of the shaping structure 1 and its mechanical strength, while imparting this macroporous nature to the sheet 9. Preferably, the sheet 9 is made up exclusively of a grid of threads.

The aforementioned grid comprises an assembly of straight threads arranged relative to one another while repeating, regularly in the plane of the grid, a preestablished elementary pattern.

In one embodiment, this pattern comprises threads crossing one another with an angle of between 45 and 90°, generally at 90°. These threads thus form longitudinal threads and transverse threads, the transverse threads being oriented with the aforementioned angle relative to the longitudinal threads. It is preferred for the transverse threads to be oriented in a direction D2 parallel to the plane P1 and perpendicular to the direction D1, said that the longitudinal threads are oriented along the aforementioned angle relative to the transverse threads. It is possible to provide that the transverse threads are oriented obliquely relative to the direction D2. In this embodiment, the pattern of the grid therefore consists of a quadrilateral, such as a parallelogram, a rectangle, a square or a diamond. This quadrilateral can be completed by a diagonal, preferably both of its diagonals, formed by diagonal threads of the grid. The pattern can also, as an example, consist of a diamond completed by one of its diagonals or both of its diagonals. In other words, by regular repetition of the aforementioned pattern, in both the longitudinal and transverse directions of the grid, this entire grid is obtained. Thus, the different threads making up the grid are positioned relative to one another following a preestablished geometry, both in terms of relative orientation and relative spacing in the plane of the grid.

In order to form the spacer sheet, it is possible to provide a superposition of several grids, in order to obtain a greater mechanical strength.

Preferably and by way of non-limiting example, the component threads of the grid may comprise threads made from glass, aramid, carbon, polyamide, cellulosic materials, metal of the copper or steel type, or a mixture of several of these materials. Other types of materials may be considered. Within the same grid, threads made from different respective materials and with different respective titers can be mixed. A material is preferred that is compatible with the material used for the central layer, and in particular which withstands the alkalinity or any acidity of the material of the central layer.

Preferably, the transverse threads of the grid are interlaced with all or some of the longitudinal threads. Thus, some threads serve as weft yarns, while other threads serve as warp yarns. In a variant, the threads do not interlace, but are superimposed, while being distributed in at least two superimposed plies. In one preferred embodiment, the grid is formed by a network of crossed or superimposed nonwoven threads comprising at least two plies of longitudinal threads between which at least one ply of transverse threads is interposed. However, the number of plies and their distribution in the thickness of the grid can be adapted to the scenario.

The threads are, at their intersections or crossings, glued or welded to one another, depending on the materials of the threads. For gluing, a binder is advantageously provided creating a series of glue spots at the intersection of the network of threads. Any binder or glue commonly used at this time in the technical field in question may be used, in particular any thermoplastic binder or glue. Non-limitingly, the connections of the network of threads forming the textile grid according to the invention may be formed by synthetic latexes (for example SBR), PVAC, plastisols, PVC, polyvinyl alcohol (PVA), conventional hotmelt impregnations, polyurethane binders or acrylic binders, for example. It is possible to provide a coating of the grid with such materials, the coating being able to allow, or at least contribute to, the gluing of the threads at their intersections.

Non-limitingly, the grid may comprise a density of longitudinal threads of between 0.25 threads per centimeter and 5 threads per centimeter, and for the transverse threads, between 0.25 threads per centimeter and 5 threads per centimeter. Preferably, between 0.5 and 2 threads per centimeter are provided.

The number of threads per centimeter determines the nominal size of the macropores. Thus, 0.5 threads per centimeter corresponds to a nominal macropore size of about 20 mm, or slightly less, which depends on the titer of the threads of the grid. 2 threads per centimeter yields a nominal macropore size of about 5 mm. 5 threads per centimeter yields a nominal macropore size of about 2 mm. 0.25 threads per centimeter corresponds to a macropore size of about 40 mm.

It is possible to provide a longitudinal thread density different from the transverse thread density. In this case, the size of the macropores is calculated from the average of the two thread density values.

Advantageously, the weight of the grid is between 5 and 300 g/m2, preferably between 100 and 200 g/m2.

Alternatively or additionally, the spacer sheet comprises a fabric loose enough to form macropores, or a layer of nonwoven material provided with through orifices forming the macropores. In general, the spacer sheet can be formed by one or several layers of any material, as long as the macropores as mentioned above are formed.

The spacer sheet 9, due to its construction in the form of a grid or in the form of the other embodiments mentioned above, imparts its self-supporting nature to the structure 1, in particular due to the flexible enough nature to deform resiliently, and rigid enough to keep the sheets 5 and 7 separated from one another.

It is also possible to provide that at least one of the shaping sheets comprises a grid. This makes it possible to impart a structural reinforcement to this shaping sheet, in particular additionally with a layer of nonwoven material. The self-supporting nature of the structure 1 is advantageously improved as a result.

As illustrated in FIG. 3, the central layer is formed by a hardenable material. "Hardenable material" refers to a material that is able to evolve from a non-hardened state to a hardened state. In the non-hardened state, the hardenable material is liquid or soft enough to be introduced, in particular by pouring or injection, between the two shaping sheets. In the non-hardened state, the hardenable material is suitable for being distributed between the two shaping sheets, in particular under the effect of gravity, vibrations and/or pressure, to occupy at least the majority of the space arranged between these two shaping sheets. The hardenable material in the non-hardened state then takes the form of the shaping sheets, that is to say, it is shaped, molded or formed by these sheets.

The hardenable material in the hardened state can be chosen to be solid and relatively hard, and thus to impart mechanical strength properties to the composite part. Alternatively or additionally, the material can be chosen so that it imparts, to the composite part in the hardened state, thermal or sound insulation properties, for which it is not necessarily solid or hard. The hardenable material goes from the non-hardened state to the hardened state by drying, or through a chemical reaction or any other means. "Non-hardened state" includes any state in which the material in question is in the process of hardening.

The hardenable material of the central layer is chosen in order, in the non-hardened state, to pass through the spacer layer by means of the macropores, but not to pass through the shaping sheets, or only to do so marginally. However, the pore size of the spacer layers is preferably chosen to allow the drying, or more generally the transition to the hardened state, of the material of the central layer. As an example, the material of the central layer can be a thermoplastic, a thermosetting material or a concrete.

In place of the aforementioned "hardenable" material, it is possible to provide a cross-linkable material, which changes between a non-cross-linked state and a cross-linked state, in a manner corresponding to the aforementioned non-hardened state and the hardened state, the considerations regarding the hardenable material, its non-hardened state and its hardened state applying mutatis mutandis to the cross-linkable material, in its non-cross-linked state and in its cross-linked state.

As hardenable or cross-linkable material, a material is preferably provided that adopts a foamed structure, that is to say, forms a foam, when it is in the hardened or cross-linked state. This in particular makes it possible to obtain the aforementioned thermal or sound insulation properties. Depending on the desired application, the foaming material is for example a polyetherimide (with a foaming solvent of the acetone type), a polyurethane (with a foaming agent of the methylene chloride and carbon dioxide type) or a foamed concrete (foaming agent with a base of proteins or synthetic enzyme). The shaping structure advantageously serves as a foam shaper, for in situ foaming of the hardenable or cross-linkable material.

"Foamed concrete" in particular refers to a mineral foam, that is to say, preferably a cement-based material, optionally sand and lime, and having an aerated structure. The foamed concrete for example has a density from 40 to 300 kg/m$^3$, for example 100 kg/m³. Advantageously, the foamed concrete is devoid of fiber and plastic material.

The aeration of the structure, or foaming, is obtained using a foaming agent like that previously mentioned, or other types of agents, depending on the desired foaming. The foamed concrete can advantageously have undergone an autoclaving step during its manufacturing.

The foamed concrete advantageously has thermal and acoustic insulation properties that are useful for construction or building renovation. The foamed concrete for example makes it possible to obtain, in itself, a thermal insulation coefficient from 0.035 W/(m·K) to 0.10 W/(m·K), for example 0.040 W/(m·K). The foamed concrete is advantageously noncombustible and non-putrescible.

Depending on the application, it is possible to provide that air and/or a specific gas is/are contained in the bubbles formed by the foamed concrete.

Preferably, each outer layer, or at least one of them, is also formed by a hardenable or cross-linkable material. It is nevertheless possible to provide a material of a different type, namely a material that does not have a hardenable or cross-linkable nature, for one of the outer layers. As an example, this non-hardenable material can be a wood, aluminum panel. It is possible to provide a preformed outer layer, which may or may not comprise a hardenable or cross-linkable material. The preformed outer layer can be formed by a hardenable or cross-linkable material that is already hardened or cross-linked, respectively.

Advantageously, the material of the central layer is different from the material chosen for the outer layer. If there are two outer layers, their respective material can be different.

"Different" material for example refers to materials comprising different components, or in different proportions, defining a different structure, or a different density. As an example, the hardenable material of the central layer has a base of polyetherimide, while the hardenable material of the outer layer has a base of polyurethane, or vice versa. According to another example, the hardenable material of the central layer has a base of thermoplastic, while the hardenable material of the outer layer has a thermosetting base, or vice versa. According to another example, the hardenable material of the central layer has a base of concrete, while the hardenable material of the outer layer has a plaster base, or vice versa. According to another example, the hardenable material of the central layer is a heavy concrete, while the hardenable material of the outer layer is a fibrous concrete, or vice versa.

However, it is possible to provide that two of the layers, if not all of the layers, among the central and outer layers, are formed with the same materials, that is to say, materials that are not different according to the above definition.

The shaping structure, irrespective of its embodiment, makes it possible to implement a method for manufacturing a composite material as defined in the preceding.

To manufacture the part 3 illustrated in FIG. 3, a step a) is carried out for introducing a hardenable or cross-linkable material, in a non-hardened state, or non-cross-linked state, respectively, between the two sheets 5 and 7 in order to form the layer 30. By shaping this material, the two shaping sheets delimit the shape of the layer 30. In other words, the shaping structure is used as shaper for the material of the layer 30. This material is next transitioned to a hardened or cross-linked state to fix the layer 30 and give it its definitive properties.

The production of the part 3 of FIG. 3 also comprises a step b) for introducing another hardenable or cross-linkable material, in a non-hardened or non-cross-linked state, against the outer face 34 of the sheet 5 in order to form the outer layer 32. This step b) is preferably carried out at the same time as step a), or after step a), while the material forming the central layer 30 is in the non-hardened or non-cross-linked state. The sheet 5 allows the materials of the layers 30 and 32 not to mix, even when they are in the non-hardened or non-cross-linked state. The hardenable or cross-linkable material of the layer 32 is next transitioned to the hardened state, to fix this layer 32.

The outer layer 33 can be formed according to an operating mode similar to that of the layer 32, or according to any appropriate operating mode.

Conversely, step b) can be carried out before step a) while the material of the layer 32 is still in the non-hardened state.

In a variant, the aforementioned step b) is carried out after step a), while the material of the layer 30 is in the hardened state. Step a) can also be carried out after step b), while the material of the layer 32 is in the hardened state.

In a variant, it is possible to provide for attaching the outer layer 32 and/or 33 against the face 34 and/or 36 in question, by joining or any appropriate attachment means, in particular if the outer layer is preformed, and/or that this outer layer comprises a non-hardenable material such as wood.

The flexible nature of the shaping sheets makes it possible to create a composite part whose shape is not necessarily that illustrated in FIG. 3. Indeed, it is for example possible to give a curved shape to the sheets 5 and 7 as long as the material of the central layer is not fixed, so as to shape the latter with a curve, in order to form a composite part with the desired shape, rather than flat.

What is claimed is:

1. A composite part comprising:
   (a) a shaping structure, comprising:
      (i) two shaping sheets comprising a first shaping sheet and a second shaping sheet facing each other at a distance from one another, wherein at least one shaping sheet of said two shaping sheets comprises a layer of nonwoven material; and
      (ii) a macroporous spacer sheet, comprising macropores, each macropore being a through-opening, the through-openings being distributed over the surface of the spacer sheet, the macroporous spacer sheet being arranged between the two shaping sheets and being corrugated in such a way so as to form a series of alternating even peaks and odd peaks distributed in a first direction of the shaping structure, at least one of the even peaks being attached to the first shaping sheet, at least one of the odd peaks being attached to the second shaping sheet, each peak attached in this way defining an attachment surface for attachment to the shaping sheet to which said peak is attached, wherein the macroporous spacer sheet comprises a grid of longitudinal threads and transverse threads connected at their intersections, the macropores being formed by the threads of the grid; and
   (b) a central layer, formed by a hardenable material, in a hardened state, wherein the central layer occupies the space between the two shaping sheets, wherein a shape of the central layer is delimited by the two shaping sheets, wherein the spacer sheet extends within the central layer, and wherein the hardenable material comprises concrete.

2. The composite part according to claim 1, wherein at least two successive even peaks are attached to the first shaping sheet, thus respectively defining two successive attachment surfaces and a length between peaks, measured parallel to the first direction between these two successive attachment surfaces and having a value of between 1.0 times and 1.5 times the value of a surface length of the attachment surface, said surface length being measured parallel to the first direction.

3. The composite part according to claim 1, wherein at least one of the attachment surfaces is attached using an attachment agent that attaches the peak in question with the shaping sheet in question, the attachment agent being distributed on the attachment surface of said peak.

4. The composite part according to claim 3, wherein the attachment agent is a thermoplastic binder.

5. The composite part according to claim 1 wherein at least one of the attachment surfaces is attached by welding of the peak in question with the shaping sheet in question, and wherein the shaping sheet in question comprises a layer of heat-sensitive material used for said welding.

6. The composite part according to claim 1 wherein at least one of the attachment surfaces is attached by sewing of the peak in question with the shaping sheet in question.

7. The composite part according to claim 1, wherein:
the even peaks are regularly distributed in the first direction and
the odd peaks are regularly distributed in the first direction.

8. The composite part according to claim 1, wherein the layer of nonwoven material comprises a glass web comprising glass fibers connected to one another.

9. The composite part according to claim 1 wherein the macropores of the spacer sheet have a nominal size of between about 2 and 40 mm.

10. The shaping structure according to claim 1 wherein the macropores of the spacer sheet have a nominal size of between about 5 and 20 mm.

11. The composite part according to claim 1, wherein the grid of threads has a density of threads of between 0.25 and 5 threads per centimeter.

12. The shaping structure according to claim 1, wherein the grid of threads has a density of threads of between 0.5 and 2 threads per centimeter.

13. The composite part according to claim 1, wherein the hardenable material has a foamed structure when the hardenable material is in the hardened state.

14. The composite part according to claim 1, wherein the longitudinal and transverse threads of the grid are connected at their intersections by gluing or welding.

15. A method for manufacturing the composite part according to claim 1, wherein the manufacturing method comprises:
introducing the hardenable material, in a non-hardened state in the shaping structure, between the two shaping sheets of the shaping structure, in order to form the central layer, wherein the two shaping sheets delimit the shape of the central layer by shaping of the hardenable material between said two shaping sheets when the hardenable material is in the non-hardened state; and
transitioning the hardenable material from the non-hardened state to the hardened state.

16. The composite part according to claim 1, wherein the two shaping sheets are impermeable to the hardenable material in a non-hardened state.

* * * * *